United States Patent [19]

Naslund et al.

[11] 3,937,306

[45] Feb. 10, 1976

[54] AUTOMATIC BRAKE ACTUATOR FOR A CHAIN SAW

[75] Inventors: Ulf Vilheim Näslund; Egil Skog, both of Huskvarna, Sweden

[73] Assignee: Husqvarna AB, Huskvarna, Sweden

[22] Filed: Aug. 27, 1974

[21] Appl. No.: 501,082

[30] Foreign Application Priority Data

Aug. 29, 1973 Sweden .............................. 7311717

[52] U.S. Cl. .................. 188/166; 30/383; 188/77 R

[51] Int. Cl.$^2$ .......................................... B60T 13/04

[58] Field of Search ............ 188/77 R, 166; 30/380, 30/381, 382, 383; 192/17 R, 80

[56] References Cited

UNITED STATES PATENTS

| | | | |
|---|---|---|---|
| 2,129,435 | 9/1938 | Morris | 192/17 R |
| 3,253,391 | 3/1966 | Meldahl | 192/17 R |
| 3,290,871 | 12/1966 | Haas | 188/77 R |
| 3,776,331 | 12/1973 | Gustafsson | 188/77 R |
| 3,839,795 | 10/1974 | Dooley | 30/383 |

FOREIGN PATENTS OR APPLICATIONS

| | | | |
|---|---|---|---|
| 1,313,888 | 11/1962 | France | 188/77 R |

*Primary Examiner*—Trygve M. Blix
*Assistant Examiner*—Edward R. Kazenske
*Attorney, Agent, or Firm*—Holman & Stern

[57] ABSTRACT

A device for automatically actuating a band brake on a motor saw for emergency stopping of the saw chain, wherein a latching mechanism including pretensioned elastic force-providing coupling is released, occurring upon a throw movement of the saw, by a pin or the like transferring a force between a carrying handle of the saw and a collapsable arm of the mechanism.

4 Claims, 3 Drawing Figures

AUTOMATIC BRAKE ACTUATOR FOR A CHAIN SAW

The present invention relates to an improvement in band brakes on portable motor saws for automatically stopping the saw chain, if the saw should throw.

BACKGROUND OF THE INVENTION

It is previously known to provide machines with emergency brakes which, should a dangerous situation suddenly arise, can be brought into operation by means of a brake actuating device. In the case of motor saws there is used, inter alia, a type of band brake having a brake band or strap placed around, for example, a clutch drum, the outside of which drum serves as a friction surface for the brake band. Under normal sawing conditions, the brake band extends loosely around the drum and does not affect the rotation thereof. Upon the activation of an activator, which may comprise a spring-tensioning device and a detachable latch means for releasing the spring, the band is drawn tightly around the drum, causing the saw chain to stop immediately. An emergency brake of this type is known from the U.S. Pat. No. 3,290,871. On present-day motor saws there is mounted adjacent the carrying handle of the saw a protective structure which is connected to the band brake actuating device, the intention being that should the saw throw, the hand of the saw operator will be thrown from the carrying handle against the protective stirrup structure, to activate said device. Since it is imperative that the brake is applied immediately the saw throws, it is obvious that precious time is wasted with this known construction before the protective stirrup structure is activated. Moreover, with the known construction the brake is not applied should the saw operator retains his grip around the carrying handle, or if, at the moment of the throw, the saw is held in a position such that said hand does not strike the protective stirrup.

SUMMARY OF THE INVENTION

With modern motor saws, the saw handle is connected to the motor, saw blade and the chain by means of vibration-damping elements made of soft rubber. In itself this means that when the saw throws it is not pulled from the hand of the operator with the same force as that experienced with saws which are not provided with such elements. This also means that when the saw throws there is movement between the handle and the motor portion of the saw.

An object of the present invention is to provide a portable motor saw having a band brake which can be applied automatically without it being necessary for the hand of the operator to release its grip on the carrying handle of the saw, whereby the aforementioned disadvantages, such as the aforementioned delay in brake actuation and the failure of the brake to come into operation if the hand of the operator does not strike the protective stirrup structure, are at least substantially eliminated. The function of the actuator according to the invention is based on the relative movement between the handle and the body of the saw occurring in motor saws provided with vibration damping means. With the saw of the present invention, should the saw throw, the actuator directly or indirectly activates the latch of a more or less conventional emergency brake. This means that the brake is brought into operation immediately the saw throws. Furthermore, the force acting on the actuator originates directly from the force in the throw, whereby the hand of the operator constituting an operative link between the handle and the protective stirrup for activation of the brake is at least partially eliminated.

According to the present invention in a motor saw of the kind discussed above, a projection means for transmitting a force occurring upon a throw movement of the saw is arranged between the carrying handle and the collapsable arm.

BRIEF DESCRIPTION OF THE DRAWINGS

A motor saw constructed in accordance with the invention will now be described by way of example with reference to the accompanying drawings, in which.

DETAILED DESCRIPTION OF EMBODIMENT

Figure 1:
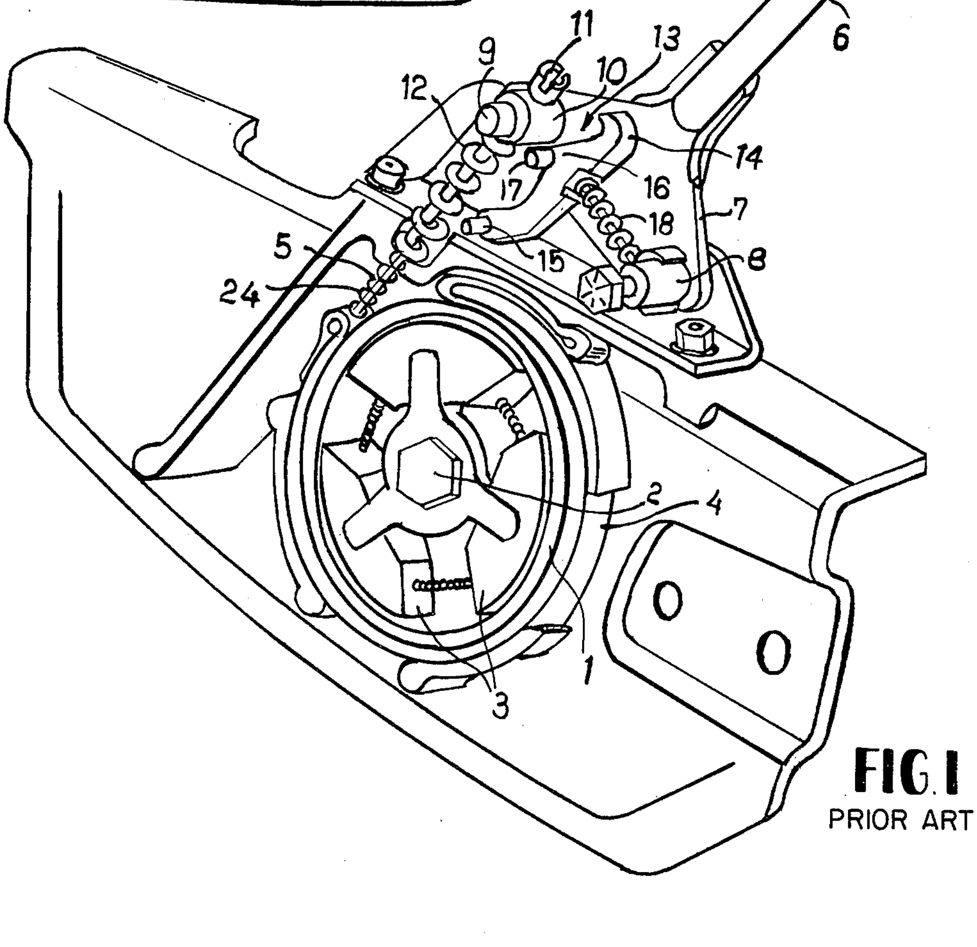
FIG. 1 PRIOR ART
FIG. 1 shows a conventional band brake.

The conventional brake shown in FIG. 1 is mounted on the side of the motor saw on which a clutch drum 1 is mounted on an outwardly projecting motor shaft 2 provided with clutch jaws 3. A brake band or strap 4 is placed around the drum and one end of said band is connected to the saw body. The other end is attached to a rod 5 which is mounted for movement in the longitudinal direction so that the band can be tightened around the drum. To effect tightening a lever arm system is arranged on the saw body, comprising a protective stirrup (collapsible arm) 6 attached to a plate 7 which is mounted on a fixedly mounted pin 8. Another pin 9 is attached to the plate and carries a bearing 10 for the rod 5, which has a screw head 11 at the upper end thereof. When the stirrup swings forwards (clockwise in FIG. 1) the rod is pulled longitudinally upwards, whereupon the band 4 is tightened around the drum.

To increase the tightening force on the band, there is provided a spring 12 and a latch 13. The latch comprises an arm 14 mounted on a pin 15 attached to the saw body and provided with a tooth 16 which engages a pin 17 attached to the plate 7. The arm is pressed against the pin 17 by a spring 18 which bears against the pin 8. The spring 12 is supported against the saw body and only contributes towards the braking force when the latch is released. This occurs when the tooth 16 slides off the pin 17, for example as a result of a blow on the stirrup 6, whereafter the force exerted by the spring 12 swings the plate and the stirrup forwards with the pin 8 as the center of rotation. Normally the force exerted on the protective stirrup by the hand of the saw operator as the saw throws is sufficient to release the latch.

Figure 2:
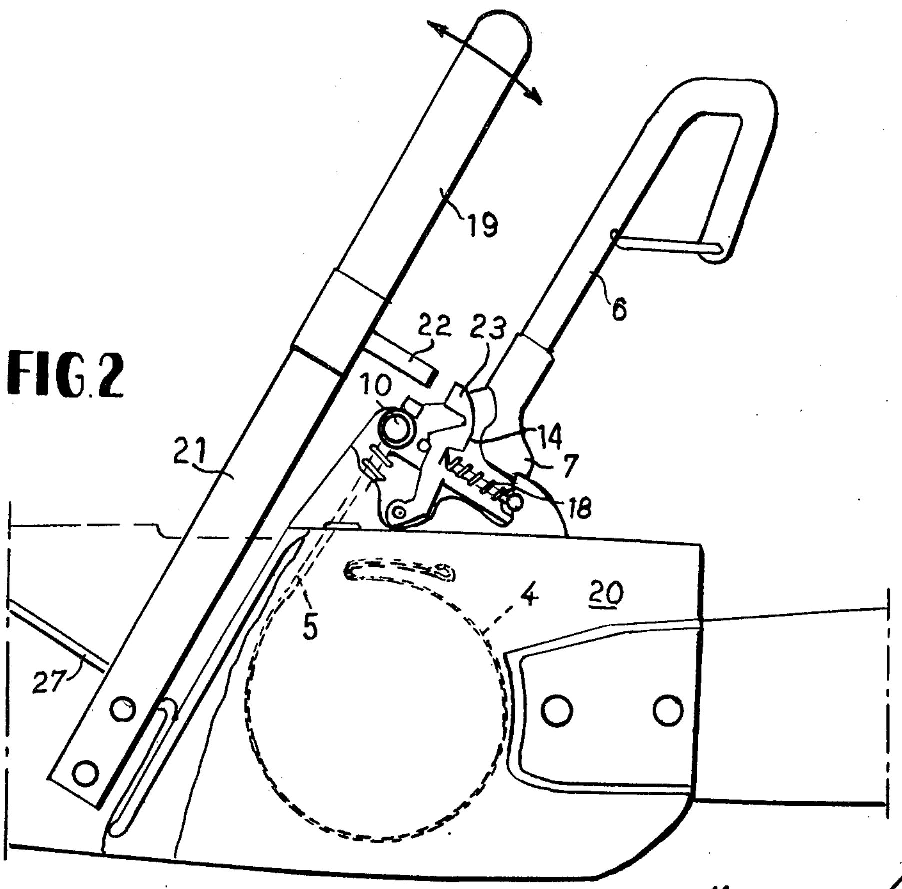
FIG. 2 shows a portable motor saw provided with a band brake actuator according to the invention.

The aforedescribed brake forms part of the art. An improved brake can be obtained with an arrangement according to FIG. 2. This Figure shows the brake diagrammatically, together with a brake actuator. With this embodiment a carrying handle in the form of a front stirrup 19 is resiliently mounted 27 to the motor and saw portion 20. The stirrup handle is sprung in the direction shown with the double arrow in the Figure. On one leg, 21, of the stirrup there is attached a pin 22 which extends towards an extension 23 of the arm 14. With a sufficiently large forward movement of the stirrup 19, this extension is struck by the end of the pin and the arm 14 is pivoted forwards against the action of the spring 18 (to the right in the Figure). This causes the latch 13 to be released and the brake to be applied to the drum, so that the saw stops. Resetting of the brake to its operational position is effected in the normal manner, by swinging the protective stirrup structure backwards to the position shown, whereupon the rod 5 is pressed down by a spring 24 (as shown in FIG. 1) so that the band releases the drum. The amount of movement of the stirrup handle 19 to effect release of the latch can be adjusted by the length of the pin being adjustable.

Figure 3:
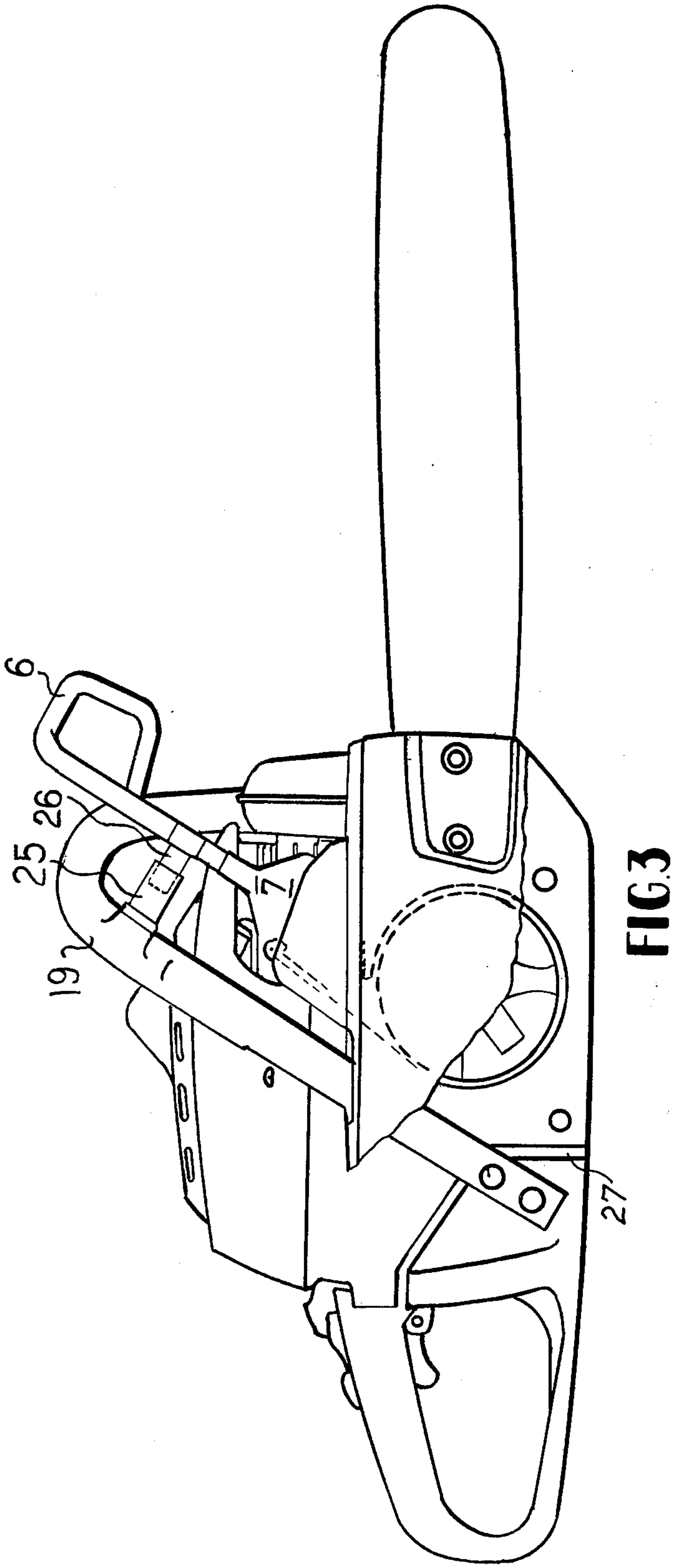
FIG. 3 is a variant of the actuator according to the invention.

The invention can also be applied to other forms of band brakes which are activated by the pivoting of a protective stirrup structure or the like adjacent the carrying handle of the saw. FIG. 3 shows a motor saw which is provided with such a brake and the carrying handle 19 of which is resiliently mounted 27 and carries an actuator according to the invention. This actuator, which in the illustrated embodiment comprises two telescopically arranged tubes 25, 26, each of which is attached to its respective stirrup, activates the protective stirrup structure directly, provided that the carrying handle 19 springs sufficiently. As a result of forward movement of the protective stirrup, the latch is released, said latch being of the same design as or a different design than that described above, whereupon a spring exerts the requisite braking force on a brake band, brake shoes or the like. The actuator can be made extremely reliable in operation and a contributory reason hereto is that possibility is found of adjusting its length of stroke by arranging an adjuster screw or the like at the end thereof. It should be noted that the actuating device already installed in the saw is not negatively affected by the additional actuator, but will still serve its purpose if, for some reason or other, the actuator 22 fails to function.

The above-described embodiments of the actuator serve as examples of how the invention can be realized. Other forms of actuating means, for example a tension device, can serve the same purpose as those illustrated. The invention is therefore not restricted to what has been described but should be considered in the scope encompassed by the following claims.

What we claim is:

1. A motor saw of the kind having a driven drum; a band brake around the drum; a pre-tensioned elastic means for supplying a tensioning force to the band; a resilient, fixed carrying handle insulated by elastic elements against vibration; a collapsible arm pivotably connected to a part of the saw which is not insulated against vibrations and arranged adjacent said handle; a latching mechanism actuatable by said collapsible arm which, when released by actuation of the collapsible arm, is arranged to release the brake so that the said band is brought into operation by means of said pre-tensioned elastic means, the improvement which comprises a projection means extending between the carrying handle and the collapsible arm for transmitting a force occurring upon a throw movement of the saw to release said latching mechanism without the operator's hands leaving said carrying handle.

2. A motor saw according to claim 1, wherein said projection means has the form of a pin.

3. A motor saw according to claim 2, wherein the collapsible arm is in the form of a forwardly collapsible protective stirrup structure.

4. A motor saw according to claim 2, wherein said latching means comprises a pawl which is spring-biased in the latching direction, and that said projection means transmits said force in the opening direction of said pawl.

* * * * *